United States Patent [19]
Chang et al.

[11] 4,221,003
[45] Sep. 2, 1980

[54] BUBBLE DOMAIN RELATIONAL DATA BASE SYSTEM

[75] Inventors: Hsu Chang, Yorktown Heights; Anil Nigam, Rochester, both of N.Y.

[73] Assignee: International Business Machines Corporation, Armonk, N.Y.

[21] Appl. No.: 902,641

[22] Filed: May 4, 1978

[51] Int. Cl.² .................. G06F 7/00; G06F 13/00; G11G 11/14; G11G 19/08
[52] U.S. Cl. .................................. 364/900; 365/15; 365/49
[58] Field of Search ... 364/200 MS File, 900 MS File; 365/1, 5, 13, 15, 49, 50, 77, 78, 183; 340/146.2

[56] References Cited
U.S. PATENT DOCUMENTS

| | | | |
|---|---|---|---|
| 3,831,152 | 8/1974 | Perneski | 364/900 |
| 3,997,882 | 12/1976 | Goyal | 365/49 |
| 4,021,791 | 5/1977 | Bobeck | 340/174 TF |
| 4,053,871 | 10/1977 | Vidalin | 364/900 |
| 4,128,891 | 12/1978 | Lin | 364/900 |

Primary Examiner—James D. Thomas
Attorney, Agent, or Firm—Jackson E. Stanland

[57] ABSTRACT

A relational data base system using magnetic bubble domain storage to eliminate data formatting, and dynamic indexing loops to facilitate convenient marking during data qualification and to eliminate redundant traversing of disqualified data during the search operation. A data base is stored in columnized storage tables which insure minimum input/output data traffic during search and retrieval. A suitable storage chip is organized in a major/minor loop organization, with several sections of transfer lines to provide selective access to individual groups of storage loops. Off-chip circuitry includes a comparator for comparing data read from a bubble storage chip with a given criterion in order to select appropriate data, and a dynamic indexing loop which keeps track of comparisons. This indexing loop provides an input to a bubble chip controller so that each subsequent search and compare is done only on already qualified data. This eliminates the need for repeated searching through the same data.

12 Claims, 9 Drawing Figures

BUBBLE DOMAIN RELATIONAL DATA BASE SYSTEM

DESCRIPTION

1. Technical Field

This invention relates to relational data base systems, and more particularly to such systems using magnetic bubble domain storage. Data is structured for this special purpose and, when mapped into the physical storage structure, facilitates data base operations.

2. Background Art

The use of data in a relational data base system is described in an article by E. F. Codd, beginning at page 377 of the June 1970 *Communications of the ACM*, Volume 13, No. 6. In contrast with conventional data base systems which generally use some form of hierarchical structure where the storage and retrieval of items of information are dependent upon a previously determined key reference which has to be used for accessing data and for writing data back into storage, a relational data base system does not organize data in a rigid fashion. Many different sets, or relations, of data may be stored in an array where accessing of any of the sets of data may be accomplished by simply naming the relation and those domains (columns) of the relation that are desired.

Relational data base systems are an attempt to simplify the user's view of information in the entire data base. In this system, a relation is viewed as a table of columns and rows. For example, a table may be entitled "Employee" and may contain columns having attribute headings such as "name", "department", "salary". This table, or "relation" is then an organized collection of data relating to the employee, while the various column headings in the table are the different attributes contained within the table itself. Another table may include as a column therein one of the columns in the "employee" table. For example, the column "name" may appear in another table which relates employees to their managers and their salary levels.

From the user's point of view, the data base is a collection of relations, or tables. The user can use the relational data base system to make new tables and to answer inquiries which he has relative to information needed in his own business or personal affairs. For example, the user can use common attributes in two tables to obtain additional relations between the data and to construct a new table. In one such operation, a user can look to a common attributable (such as "name") which appeared in the two aforementioned tables and can then construct another table comprised of columns from the first and second tables. In this way, he can create a new relation which has columns which previously were not combined in any single table. Thus, relational data base systems are highly user-orientated and are very useful in the operation of certain businesses, among other things.

Technical articles generally dealing with relational data base systems include the following:

1. C. S. Lin et al, ACM Transactions on Data Base Systems, Volume 1, No. 1, March 1976, pp. 53–65.

2. E. A. Ozkarahan et al, National Computer Conference, 1975, pp. 379–387.

3. Computer Systems Research Group, University of Toronto, Toronto, Canada, Report M5S1A4 (to appear as number 30 of ENGINEERING FORUM, a publication of the Facility of Applied Science & Engineering of the University of Toronto, Toronto, Ontario, Canada).

4. S. A. Schuster et al, "A Virtual Memory System for a Relational Associative Processor", AFIPS Proceedings, Volume 45, p. 861, 1976.

5. B. Hsiao and S. Madnick "Data Base Machine Architecture in the Context of Information Technology Evolution, Proceedings of the 3rd International Conference on Very Large Data Bases" (IEEE publication 77CH1268-2), pp. 67–68, 1977.

Also, U.S. Pat. No. 4,040,018 in the name of H. Chang et al, and assigned to the present assignee, describes a data management system using magnetic bubble domain shift registers which are linked by binary switches. These switches enable two streams of bubble domain data to either cross one another non-destructively or to bypass one another. In this manner, a variety of data structures can be provided, such as last in—first out, and first in—first out, as well as dynamic rearrangement of data items.

Copending application Ser. No. 755,892, filed Dec. 30, 1976, now U.S. Pat. No. 4,128,891, describes a relational data base system using magnetic bubble domain storage. Information is stored in tables using a hybrid major minor loop and decoder form of memory organization, wherein individual rows of the tables can be selectively accessed.

Heretofore, the data modularity and electronic timing of bubble devices has not been fully exploited for use in relational data base systems in order to achieve architectural advantages. In the present invention, both the data structure in the storage and data retrieval are made to conform to the relational data model. An instruction set is adopted which is adequate for the creation, modification, and manipulation of the data base. This instruction set, although versatile for data base operations, is simple enough to be incorporated in commercial microprocessors. The data base storage can utilize commercial bubble chips such as described by J. E. Juliussen in IEEE Electro 77, Professional Program, Update on Bubble Memories, Paper 12.5, New York, Apr. 19–21, 1977, and *Electronics*, Volume 50, No. 16, pp. 81–86, Aug. 4, 1977.

In the present system, data is structured for relational data base purposes before storage into general purpose magnetic chip. When the data structure is mapped into the physical storage structure in that manner, data processing is facilitated. Additionally, the modularity of data is aided by modularity of accessing using means to access selected columns in a stored relation, and dynamic indexing loops to eliminate redundant searches.

Accordingly, it is a primary object of the present invention to provide a relational data base system using magnetic bubble domains, which provides improvements in storage, search, and retrieval operations.

It is another object of the present invention to provide a relational data base system using magnetic bubble domains in a way to enhance data qualification and to eliminate redundant traversing of disqualified data.

It is another object of the present invention to provide a system for relational data base operations using hardware which is particularly suited for those operations.

It is another object of the present invention to provide a magnetic bubble domain relational base data system having superior performance in contrast with prior art relational data base systems.

Another object of the present invention is to provide a magnetic bubble domain relational data base system which takes advantage of the data modularity of bubbles and electronic timing of bubble domain storage chips.

It is another object of this invention to provide a relational data base system in which the hardware is tailored to the data model so as to simplify the software required for data access and search.

BRIEF SUMMARY OF THE INVENTION

This bubble domain relational data base system uses a plurality of bubble storage chips in combination with data base logic cells. The logic cells are external to the bubble domain chip and are used for associative search, linking relation, etc. A directory is provided which keeps track of the storage locations of the various relations, or tables, which are in storage in individual bubble chips. A bubble chip controller receives an input from the directory and is used to select particular columns of data stored in an individual bubble domain chip. Information taken from a bubble chip is compared with test information in a comparator. Dynamic indexing loops are provided which are of equal bit length and in synchronization with the bubble domain shift register loops in the bubble domain chips. Each bit position in the dynamic indexing loop is used to index a record stored across the bubble domain shift register loops (i.e., a tuple).

When a comparison criterion is satisified for a data item retrieved from a tuple, a marker bit is put in the dynamic indexing loop against that tuple. The loop also provides an indication to the bubble chip controller. Thus, for subsequent associative search, comparisons will be made only on the data for which a marker bit has been indicated in the dynamic indexing loop. In this manner, the search time is minimized, since it is not necessary to search through data items which do not meet initial criteria.

Each bubble domain storage chip holds a relation, or table, in a plurality of minor loops. A read major path and a write major path are provided for taking information from selected minor loops, and for placing information into selected minor loops, respectively. Multiple segments of transfer lines are provided so that groups of minor loops can be individually accessible via their respective transfer line segments. The tabular data to be stored in each bubble chip is stored in columns with each column attribute occupying the space of a group of minor loops. A longer attribute may occupy more than one group space. Segments of transfer lines are provided so that each attribute can be retrieved individually and exclusively in order to reduce input/output time.

Information read-out from a particular attribute is sensed and sent to a comparator in a data base logic cell. A register is used to provide test criteria to the comparator for associative search of the data read out from the bubble domain storage chip. As noted earlier, a dynamic indexing loop is used to keep track of comparison results and only the information which satisfies the comparison criterion will be indexed in the loop. Thus, the indexing loop is a dynamic one whose status can be constantly updated, to reflect the cumulative results of the preceding comparisons.

The indexing loops can serve each and all attribute columns (i.e., all minor loops groups or all domains in the relation), singly or in combination, successively or simultaneously.

When two indexing loops are used appropriately, the duplicates of items in a column can be eliminated. Moreover, an indexing loop provides a convenient link to relate data on separate chips, and provides a flexibility and versatility which enhances data manipulation capability of the bubble storage. These index loops are not registers of static relationships among records, as are pointers and indices used with disk files, but rather are registers of a dynamic relationship among records as evolved from each query, or other varied operations.

CCD's or semiconductors can also be used to provide storage chips analogous to the bubble storage chips described herein. The same type of chip organization and indexing loops can be used with CCD or semiconductor storage chips in which data is stored in tabular form.

These and other objects, features and advantages will be more apparent from the following more particular description of the preferred embodiments.

BRIEF DESCRIPTION OF THE DRAWINGS

FIGS. 5A and 5B (consisting of FIGS. 5B-1 and 5B-2 on separate drawing sheets) are illustrations of the use of the relational data base system of this invention to do a query example (2).

DETAILED DESCRIPTION OF THE PREFERRED EMBODIMENTS

Figure 1:
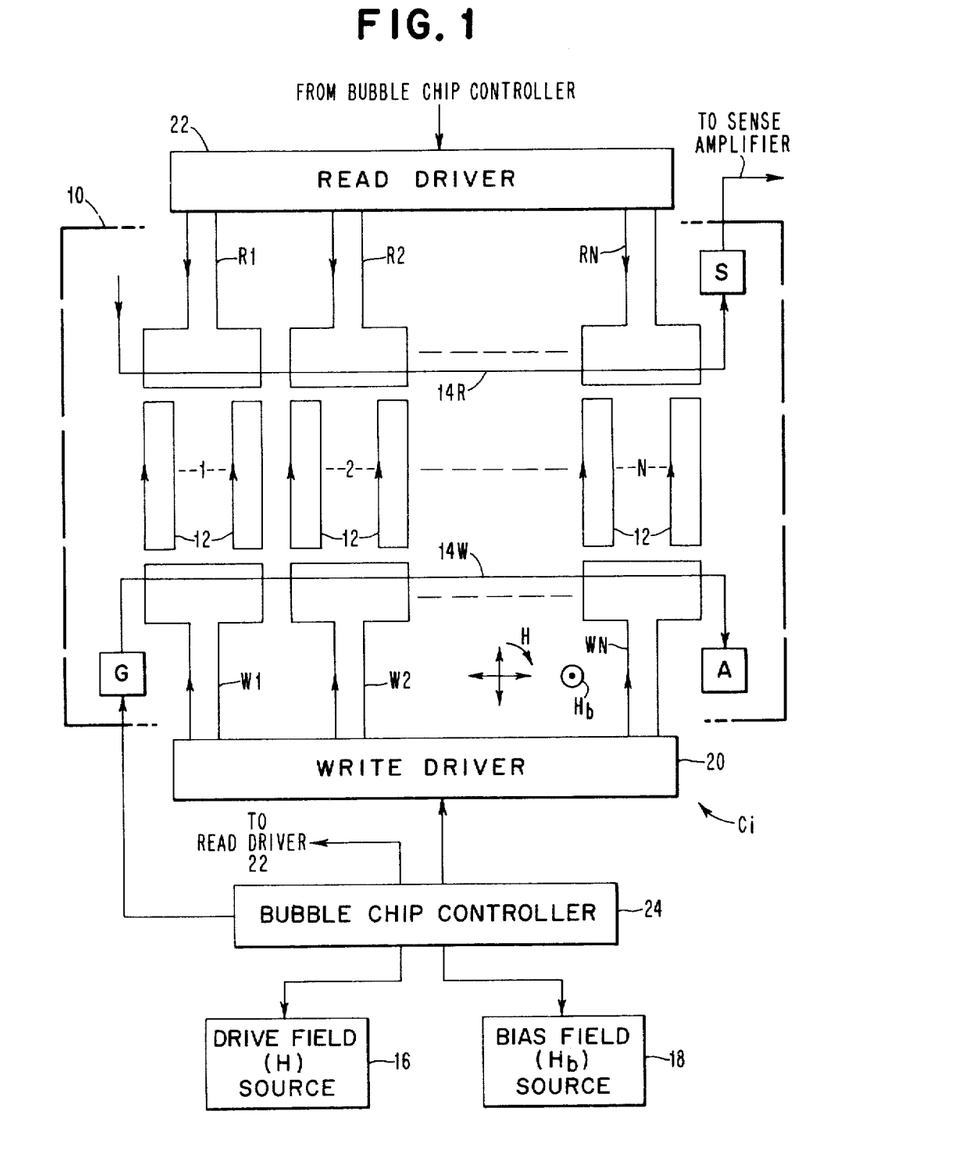
FIG. 1 is an illustration of a bubble domain chip for storing a relation, or table, which is organized in a major/minor loop type of memory organization, and which stores information in tabular form.

BUBBLE DOMAIN STORAGE CHIP (FIG. 1)

Figure 4:
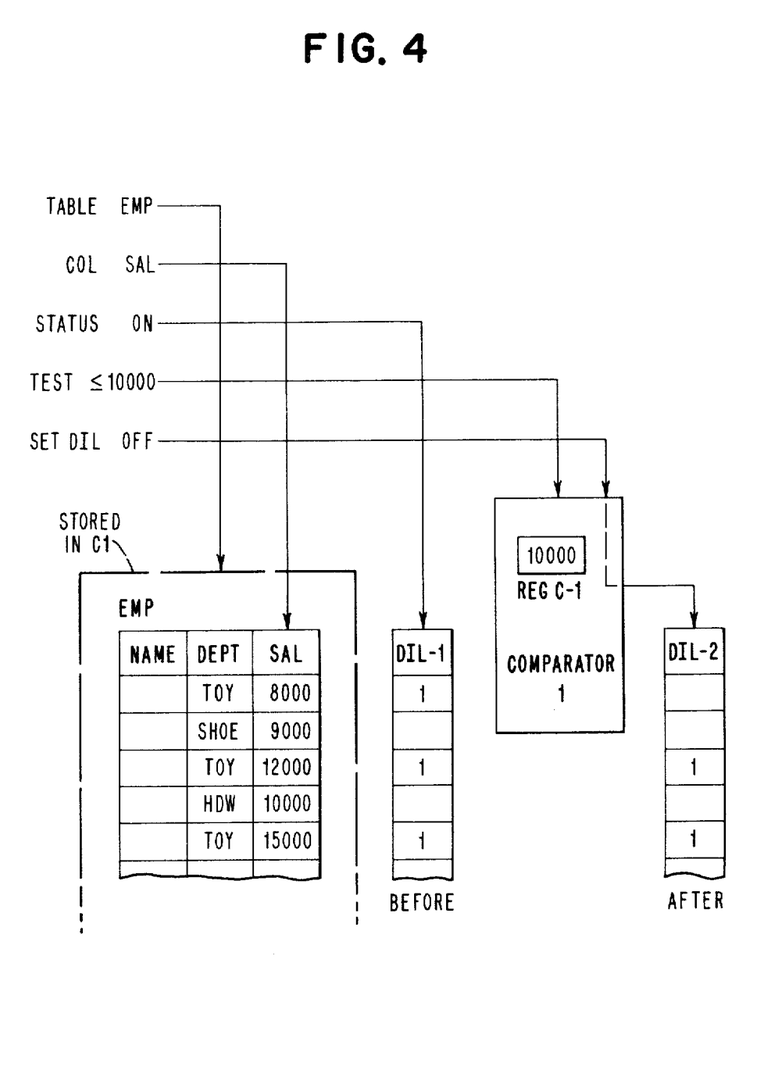
FIG. 4 is an illustration of the use of the relational data base system of this invention to do a query example (1).

This figure shows a bubble domain storage chip Ci (i=1, 2, ... n) which is suitable for use in a relational data base system. Each such chip stores a complete relation, or table of data. For example, FIG. 4 shows a portion of the "employee" table which includes columns headed "name", "department", "salary". Thus, a record of data on an employee (in a line) has several attributes, where an attribute is the name of a column in the table. Many records when aligned will form columns for the various attributes.

The bubble storage chip of FIG. 1 has capability of storing information in rows and columns, where individual columns can be readily and selectively accessed. This is the basic major/minor loop type of memory organization, and is not dissimilar from that shown in U.S. Pat. No. 4,021,791. An individual bubble domain storage chip includes a substrate 10 comprised of a magnetic film in which bubble domains can be moved, and circuitry thereon for providing a plurality of storage loops 12. These are individual shift register loops, such as minor loops in a major/minor loop memory organization.

Bubble domains are provided for transfer into individual minor loop 12, from write major path 14W. Bubble domains taken from the minor loops are propagated along read major path 14R. Minor loops 12, and major paths 14W and 14R can be comprised of any type of bubble domain propagation elements, including both gapped elements and those which are contiguous with one another. These bubble domain propagation paths are shown as heavy lines in this drawing.

Minor loops 12 are divided into N groups, each group of which is individually accessible via individual transfer-line segments W1, W2, ... WN. As is known in the prior art, transfer gates (not shown) are located between the write (or read) major paths and the individual minor loops 12. Current actuation of the transfer gates will cause bubble domains to be placed into the minor loops 12 from write major path 14W. Correspondingly, activation of read transfer lines R1, R2, ... RN will activate transfer gates located between minor loops 12 and the read major path 14R. This is used to remove information from the selected minor loops. Replicate-type transfer gates can be used to provide non-destructive read-out, or the information read-out can be replaced later (or in the same storage cycle).

For example, if it is desired to place information into the first group, 1, of minor loops, a current pulse will be sent through transfer line W1. This will activate the current actuated transfer gates between the major path 14W and the minor loops 12 in group 1. When it is desired to remove information from the minor loops in group 1, a current pulse will be sent through read-out transfer line R1. This will activate transfer gates located between read major path 14R and the minor loops in group 1.

The rest of the read and write circuits are conventionally well known. For example, generator G is used to produce patterns of bubble domains which move along write major path 14W. Bubble domains moving along this path which are not transferred into the minor loops 12 are sent to an annihilator A, where they are destroyed.

Figure 2:
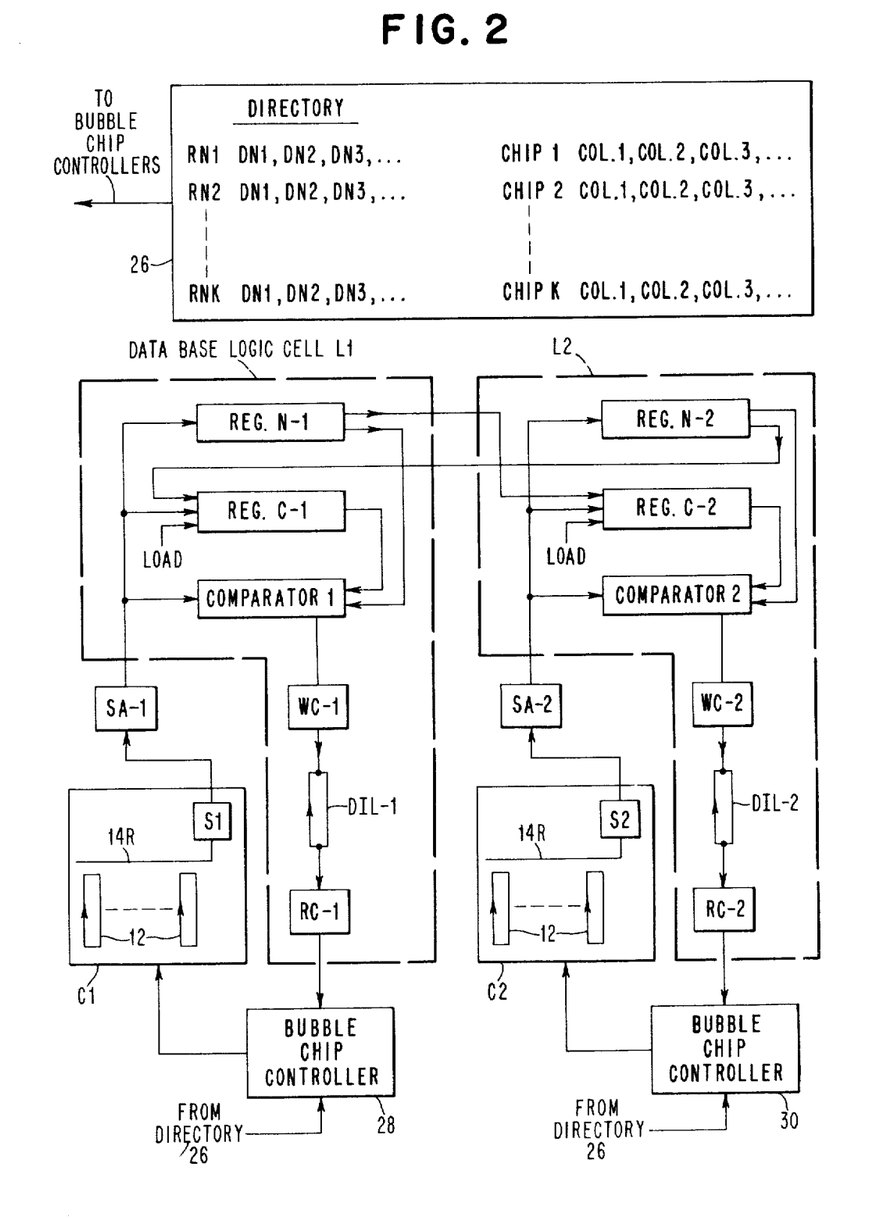
FIG. 2 is an illustration of part of a system which can do relational data base operations, using the bubble domain storage chips of FIG. 1, together with data base logic cells.

Bubble domains removed from the minor loops 12 are propagated along rear major path 14R to a sensor S where they are detected. The output of the sensor S is sent to a sense amplifier which can be located remote from the bubble domain chip, as is shown in FIG. 2.

Propagation of bubble domains along the write and read major paths, and along the minor loops is in response to the reorientation of a field H in the plane of the propagation elements. Reorienting magnetic field H can be produced by well known circuitry, which is represented by the drive field source 16. The diameter of the bubble domains in substrate 10 is stabilized by the bias field $H_b$ which is produced by the bias field source 18. This field source is also well known in the art.

A write driver 20 is used to provide current pulses in appropriate write-in transfer lines W1-WN. Write driver 20 is a conventional current source which can be activated to provide current pulses on selected transfer lines W1-WN.

A read driver 22 is provided for exercising read-out transfer lines R1-RN. Read driver 22 is also well known in the art, and is typically a current source which is used to apply current pulses in selected transfer lines R1-RN.

A bubble chip controller 24 is provided for controlling the operation of write driver 20, read driver 22, and magnetic field sources 16 and 18. Bubble chip controller 24 also provides an input to domain generator G in order to provide a pattern of domains/voids along write major path 14W. Bubble domain chip controller 24 is known in the art, and can be, for instance, the Texas Instruments TMS9916 Controller, enhanced with some additional logic. This controller is available for use with a TI0103 chip, which is a magnetic bubble domain chip capable of storing 92K useful bits in a major/minor loop organization. Such a chip includes a detector and a current-controlled bubble domain nucleator (generator G).

The bubble domain chip of FIG. 1 can be used to store data in tabular form. Each attribute column of a table occupies the space of a group of minor loops. A longer attribute may occupy more than one group space, i.e., include more than one group 1, 2, ... N of minor loops 12. Each attribute can be retrieved individually and exclusively to reduce input/output time.

Figure 3:
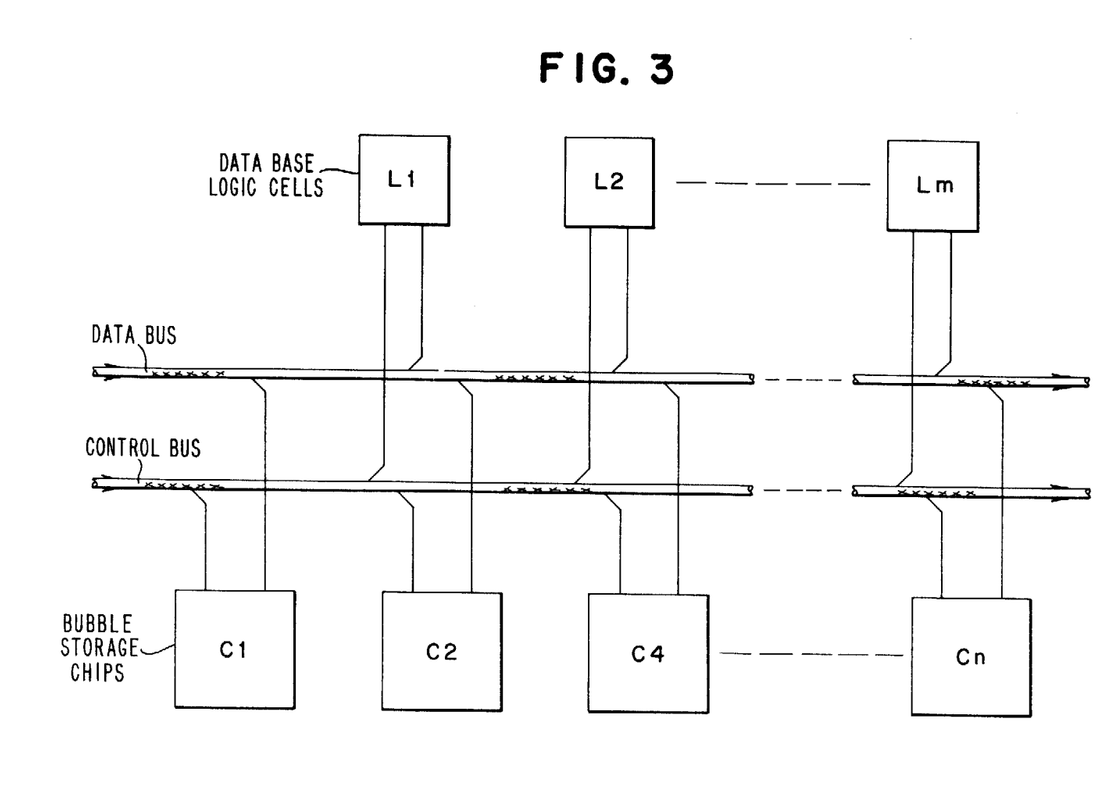
FIG. 3 is an illustration of a bubble domain relational data base system in which a plurality of bubble storage chips C1-Cn are used in combination with a plurality of data base logic cells L1-Lm. This FIG. illustrates the sharing of a small number of data base logic cells among many bubble domain storage chips using a data bus and a control bus.

As will be seen by referring to FIG. 3, a plurality of bubble domain storage chips, each of which stores a complete relation, can be used together in a relational data base system in accordance with the present invention. FIG. 1 is used merely to illustrate the hardware components of an individual storage chip Ci.

Still further, it should be noted that individual storage chips in accordance with the present invention need not be organized in a major/minor loop form of organization. The invention more broadly uses a plurality of bubble domain chips for storing information in tabular form and, as will be seen later, includes novel structure for enhancing data retrieval and comparison in order to facilitate relational data base operations. Thus, other types of storage organizations can be used to store bubble domain information in the storage chip if they provide tabular storage of the bubble domain data. In so doing, the data need not be formatted, since it is already in tabular form which lends itself to relational data base operations.

RELATIONAL DATA BASE SYSTEM ORGANIZER (FIGS. 2 AND 3)

These figures illustrate the organization of a relational data base system in accordance with the present invention, using as storage chips the bubble domain chips Ci shown in FIG. 1. In particular, FIG. 2 shows two such chips C1 (i=1) and C2 (i=2), which are provided with data base logic cells L1 and L2, respectively. The logic cells L1 and L2 are components which are separate from the bubble domain chips C1 and C2. They provide the structure which can be used for associative search and compare operations and include the dynamic indexing loops DIL-1 and DIL-2.

The directory 26 is used to guide the bubble chip controllers 28 and 30 associated with chips C1 and C2, respectively. The directory is a separate storage unit which could be comprised of a magnetic bubble domain storage or a semiconductor storage. Directories are well known in the art, and this particular one is used to store the addresses of all relations RN1, RN2, ... RNK, as well as their domains DN11, DN12, ... DN21, DN22, ... Individual relations include columns of information DN1, DN2, DN3, . . . . In the directory shown, relation RN1 is located on chip 1, while relation RNK is located on chip K. Thus, the directory is used to keep track of the various relations that are included in bubble domain storage and the particular bubble domain chips in which the relations are stored.

In using the apparatus of FIG. 2, a user input would be routed through the directory, which in turn provides control inputs to the bubble domain controllers used to activate the read and write drivers for each of the bubble domain chips. Circuitry is provided for updating the directory, depending upon whether or not the number of tables and the domains contained in each are increased or decreased, and on whether the location of individual tables or individual domains in different magnetic bubble domain chips is changed.

In the execution of queries in a data base, each table stored in each bubble domain chip is considered to be somewhat of a separate entity. The user links togethr the various tables in order to answer his inquiries. Thus, separate tables are provided on separate magnetic bubble domain chips and the user goes from one chip to another. In the practice of the present invention, data need not be moved extensively from one chip to another. Instead, associated dynamic indexing loops (DIL) are used to indicate whether or not the search criteria have been satisfied. Further inquiries involve only the use of the indexing loops (rather than the columns already searched), which are continuously updated. Moreover, before two tables are linked, duplicate values can be eliminated by using the indexing loops, so as to reduce the transfer of data.

Information read from chip C1 goes from sensor S1 to sense amplifier SA-1, and then into data base logic cell L1. Correspondingly, bubble domain information detected by sensor S-2 is sent to sense amplifier SA-2 and then into data base logic cell L2. Logic cells L1 and L2 provide the associative search and dynamic indexing which allows comparisons to be made quickly and which eliminate the need for redundant comparisons.

In more detail, logic cell L1 contains register N-1, register C-1, a comparator, a write circuit WC-1, a dynamic indexing loop DIL-1, and a read circuit RC-1. The output of the read circuit is an input to the bubble domain chip controller 28. Similar components are found in logic cell L2, and are correspondingly indicated. Thus, the counterpart of register N-1 in cell L1 is register N-2 in cell L2.

Register N-1 is connected to sense amplifier SA-1, while register N-2 is connected to sense amplifier SA-2. As will be more apparent when query examples are discussed, registers N-1 and N-2 are used to eliminate duplicates in a column of data being read out from chips C1 and C2, respectively. The output of registers N-1 goes to comparator 1 and also to register C-2 in logic cell L2. Correspondingly, outputs from register N-2 go to comparator 2 and register C-1 in logic cell L1.

Register C-1 is used to provide test criteria to comparator 1 in order to allow the comparator to perform associative search on data read from columns in chip C1. Therefore, test criteria can be loaded into register C-1 externally (via LOAD input) or from register N-2 in cell L2. In the same manner, register C-2 provides test criteria to comparator 2 in cell L2. These test criteria are placed in register C-2 externally (LOAD input) or from register N-1 in cell L1.

As will be more apparent later, the storage chips C1 and C2, and the logic cells L1 and L2 interact with one another and test criteria developed from one search and comparison can be used in another search and comparison. This means that comparisons will be made only on selected data, rather than having a plurality of comparisons on the same data. The interconections between the registers N and the registers C allow such updated comparisons to take place.

Comparator 1 is used to provide associative search of data read from chip C1 and the test criteria provided by either register C-1 or register N1. In a similar manner, comparator 2 in logic cell L2 is used to provide associative search on data read from chip C2, using the comparison criteria from either register C-2 or register N-2. Thus, test criteria can be imposed by the user (via the LOAD input) or by what was taken from elsewhere (registers C-1, N-1 and C-2, N-2) in the relational data base system.

Write circuit WC-1 receives the output from comparator 1 and, if a match is found, WC-1 will cause a bit to be written into the dynamic indexing loop DIL-1. Comparator 1 forms a (bit-by-bit or otherwise) comparison of the data items taken from chip C1, with the test criteria established by either register N-1 or register C-1. Loop DIL-1 is of equal bit length and in synchronization with the minor loops 12 in chip C1. This indexing loop could be implemented on bubble storage chip C-1, but is more conveniently implemented on a semiconductor control chip, along with the rest of the structure found in logic cell L1. Loop DIL-1 is 1 bit wide, and stores 1 bit for each comparison made between a data item taken from chip C1 and the test criteria in comparator 1. Tuples (i.e., rows) of tabular data taken from chip C1 are compared with test criteria in comparator 1. For each data item in a tuple which is matched by the test criteria in comparator 1, one marker bit will be placed in DIL-1. The marker bits for different data items in a tuple are contiguous to one another in this indexing loop.

Marker bits from DIL-1 determine which data values are to be subsequently read out from chip C1. Thus, readout circuit RC-1 provides an input to bubble chip controller 28.

Since the record in the indexing loop is only 1 bit wide, the indexing loop record can be read much faster than the many-bit wide records in the bubble domain chip. This is one reason why the present system uses less hardware than prior art relational data base systems and why search and retrieval operations are done quickly.

The components in data base logic cell L2 are the same as those in logic cell L1. Since they are interconnected in the same manner and function the same as the corresponding components in cell L1, they need not be described further.

FIG. 3 illustrates a relational data base system using a plurality of bubble domain storage chips C1, C2, . . . Cn. A plurality of data base logic cells L1, L2, . . . Lm is provided. It should be understood that the relational data base system of FIG. 3 can be operated with only two data base logic cells, but more may facilitate or expedite the operation of a practical system. It should also be noted that various queries may require from one to four dynamic indexing loops per logic cell. On instance of the use of multiple logic cells is to accommodate the growth of the number of tuples per table by adding chip(s) along with logic cells.

A small number of data base logic cells can be shared among a large number of bubble domain storage chips by using a data bus along which data flows between each of the bubble storage chips C1-Cn and the logic cells L1-Lm. A control bus is used to interconnect the bubble storage chips and the logic cells, through the bubble chip controllers used to activate the write and read drivers in each of the bubble chips. Thus, the control bus interrelates the storage chips and the logic cells and would be, for instance, connected between the read circuits RC-1, RC-2, etc. and the bubble chip controllers as well as the directory.

Figure 5A:
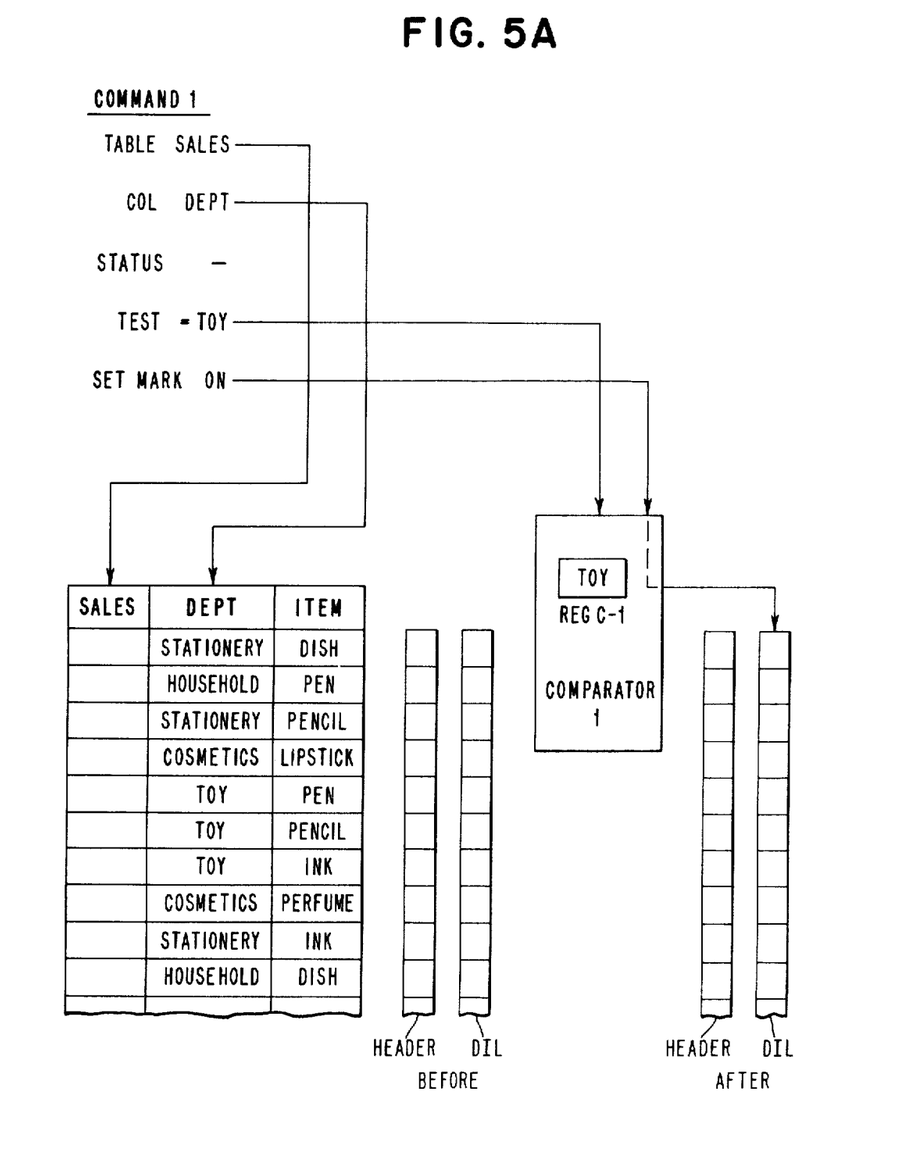
Figures 5B, 5B:
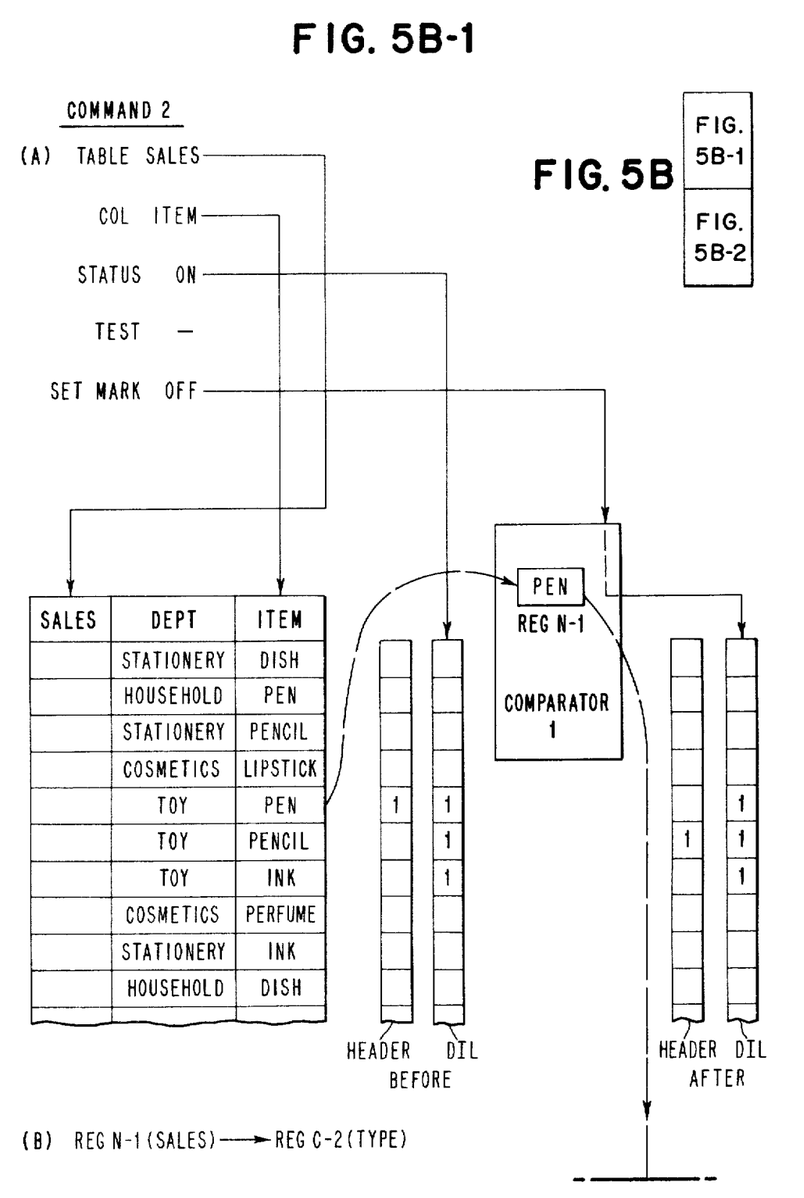
Figure 5B:
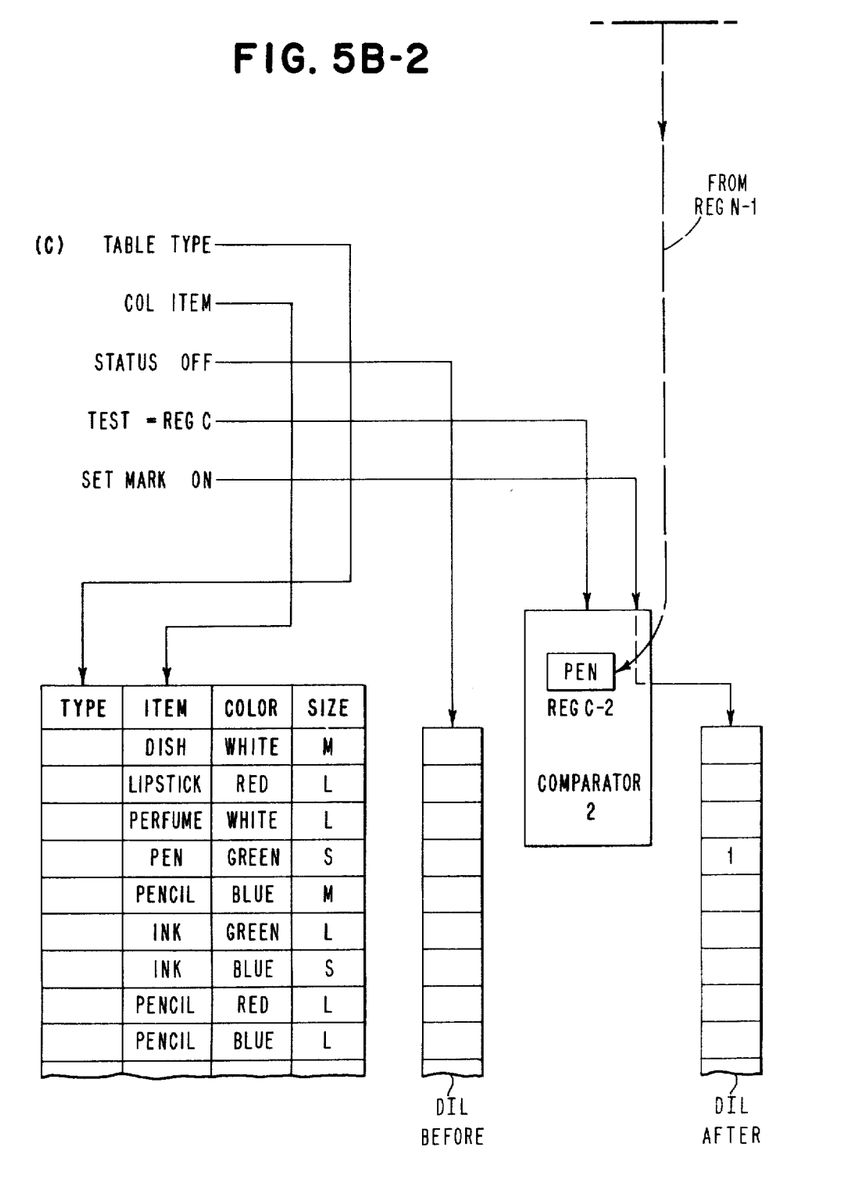
Figure 6:
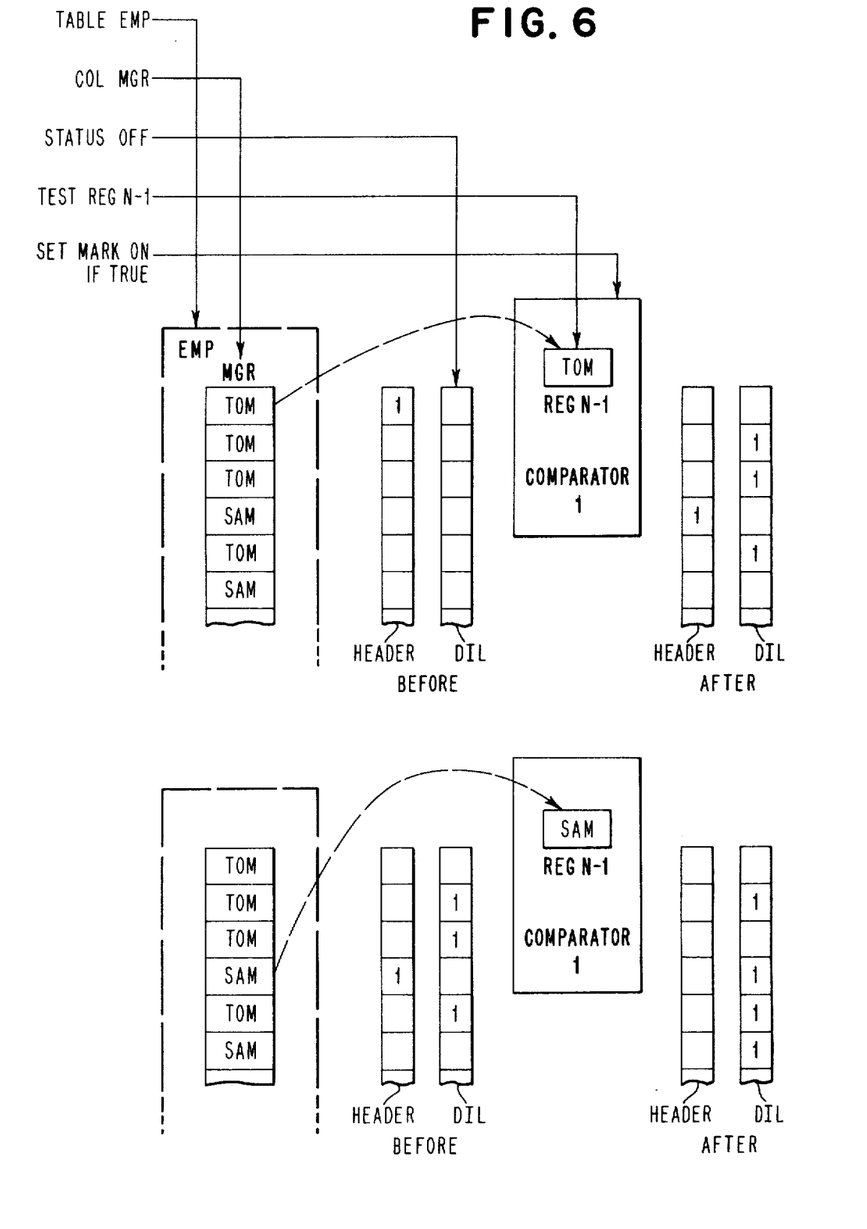
FIG. 6 is an illustration of the use of the relational data base system of this invention to do another query example (3).

EXAMPLES (FIGS. 4–6)

The operation of the system shown in FIGS. 1-3 is most clearly illustrated by examples which show the use of the system to execute various queries. Three such examples are shown in this portion of the specification.

EXAMPLE 1

Query: Print the names of the employees who work in the toy department and earn more than $10,000.

FIG. 4 illustrates how this query is executed in the relational data base system shown in FIG. 2. First of all, data is stored in tabular form in the magnetic bubble domain storage chip. A record of data on an employee (in a row or tuple) has several attributes (name, department, salary, manager, etc.). Many records when aligned with one another will form columns for the various attributes. When the query is analyzed several features are noted:

(1) The target items (names) and the search items (department, salary) are different.

(2) There are multiple search criteria (department=toy, salary>$10,000).

(3) The search is based on content, rather than on the address of a data item.

FIG. 4 illustrates the operation. The EMPLOYEE table is stored in chip C1. This FIG. indicates the status of the dynamic indexing loop DIL-1 at two different times, indicated on this FIG. as being "before" and "after".

The query is executed by the following set of commands:

|  |  | EXECUTION |  |  |  |
|---|---|---|---|---|---|
| COMMAND | TABLE | COLUMN | DIL STATUS | TEST | SET DIL |
| SELECT | EMP | DEPT | OFF | =TOY | ON |
| SELECT | EMP | SALARY | ON | ≦10K | OFF |
| READ | EMP | NAME | ON | — | OFF |

The column headed COMMAND is used to indicate the operation being performed in the storage chip C1. For example, a command to SELECT is a command to locate a particular column in the EMPLOYEE table stored in chip C1. This causes the bubble chip controller to access items in the selected column of the table, the accessed items being sent to the data base logic cell L1.

The column headed TABLE lists the particular table on which a command is to be executed. As will be remembered, the location of the chip which stores that table is contained in the directory 26 (FIG. 2).

The heading COLUMN gives the column in the table on which the command is to be executed. The heading DIL STATUS gives the status of the index loop, which depends upon whether or not matches have been made by comparator 1.

The heading TEST tells what test criteria are presented to comparator 1, in order to look for match/mismatch of the data from chip C1.

The heading SET DIL tells whether or not a bit is to be written into the dynamic indexing loop. If the test conditions in comparator 1 are met, a bit will be entered into the indexing loop.

In the execution of this query, the first command (SELECT) locates the DEPT column in the EMP table in chip C1. Initially the dynamic indexing loop is blank (OFF). All items in the DEPT column are retrieved from chip C1 and compared bit-by-bit in serial fashion to a value TOY stored in the register REG C-1, by a one bit comparator 1. The matched items are marked in the dynamic indexing loop as shown in FIG. 4. Since TOY was found in the first, third and fifth tuple of the table, the first, third and fifth bit positions in the indexing loop will be written into.

The second command (SELECT) is similar to the first command, but with three differences. The first difference is a very significant one; viz., only the SALARY items from the marked record (STATUS ON) are retrieved from chip C1 and compared to the content (10K) in REG C-1. Secondly, this test is not for a match but for ≦10K; i.e., it is a context search. Thirdly, since the intent of this command is to further screen already qualified records taken from chip C1, disqualification is registered by setting SET DIL OFF. Thus, the third and fifth data items in the SALARY column of the EMP table contain salaries greater than 10K. A marker bit is left in the dynamic indexing loop at those two bit positions, but is removed from the first bit position because the salary indicated there is less than 10K. FIG. 4 shows the indexing loop after the second comparison is made, indicating that the only data items which satisfied both comparisons are the data items in rows 3 and 5 of the EMP table.

The third command (READ) is simply to read out from the NAME column of the EMP table all qualified items (i.e., items in rows 3 and 5) and then to reset the dynamic indexing loop to its initial status.

EXAMPLE 2

Query: Print all the green items sold by the toy department.

To begin with, two data tables are assumed. These are the SALES table having columns headed DEPT and ITEM. The other table is the TYPE table having columns headed ITEM, COLOR, and SIZE.

The target (ITEMS) and the search items (GREEN, TOY) are different and there are multiple search criteria (DEPT=TOY, COLOR=GREEN).

The selection process is to be applied to the TYPE table and the data to be retrieved are contained in the SALES table. The link between the two tables is ITEM. The sequence of commands to execute the query is shown in the following table.

|  |  |  | EXECUTION |  |  |
|---|---|---|---|---|---|
|  | COMMAND | TABLE | COLUMN | DIL STATUS | TEST | SET DIL |
| (1) | SELECT | SALES | DEPT | — | =TOY | ON |

-continued

| COMMAND | TABLE | EXECUTION COLUMN | DIL STATUS | TEST | SET DIL |
|---|---|---|---|---|---|
| (2A) WHILE MKD-CNT DO [ | SALES | — | — | ≠0 | — |
| (2B) SE-LECT-NEXT | SALES | ITEM | ON | — | OFF |
| (2C) REGC ← REGN | TYPE SALES | | | | |
| (3) SELECT ] | TYPE | ITEM | OFF | =REGC | ON |
| (4) SELECT | TYPE | COLOR | ON | ≠GREEN | OFF |
| (5) READ | TYPE | ITEM | ON | — | OFF |

Execution of this query involves the operation of a DO-loop. This type of operation will be explained in detail in Example 3, but will be described somewhat here. A DO-loop operation is always used in a SELECT-NEXT command, since the elimination of duplicates (an important function of SELECT-NEXT) requires looping operation. A column is repeatedly searched; each time a unique value is selected and its duplicates removed. For example, repeated operations will be done on the ITEM column in the SALES table.

A DO-loop is indicated in the execution table as DO[ ]. This indicates that the commands located in the brackets are to be done repeatedly until the marker counter becomes zero (i.e., when all unique values are identified, and their duplicates removed).

A dynamic indexing loop, termed a header loop, is always used with a DO-loop operation. The header loop contains only one bit. This bit moves down the header loop to the location of the first new item in the column (hence the next unique value) after the sequence of commands in the brackets are executed for the preceding unique item. The bit in the header loop indicates where a new search cycle begins and with each cycle the header bit is advanced to the first value different from the present unique value. All unmarked items (i.e., those different from the already retrieved unique values and their duplicates) are compared to some search criteria.

As will be appreciated from this example, two data tables are used. A unique value of an item from the SALES table will be selected and sent (without the voluminous duplicates) to the second table. This unique value will then be used as a search criterion for values taken from the ITEM column of the second table to see if there is a match. Thus, the linking ITEM column from each table will be used to answer the query.

The importance of the DO-loop operation to improve the speed at which the final answer to the query is obtained will be apparent when one considers that the toy department usually will sell a plurality of items, and that some items sold by the toy department will also be sold by other departments. Thus, in the first step, items sold by the toy department will be selected. After this, each of the unique items sold by the toy department will be checked to see if they are green.

FIG. 5A illustrates the execution of command 1, while FIG. 5B illustrates the execution of command 2. Command 2 is broken into three parts: A, B and C, as illustrated in FIG. 5B and as shown in the execution table above.

Command 1 is a SELECT command which is used to mark all the records in the SALES table which pertain to the TOY department. FIG. 5A illustrates this operation and shows the status of the header loop and the dynamic indexing loop (DIL) before and after the compare operation. The search criterion TOY is placed into register C-1, and the various departments listed in the DEPT column are compared with this in a bit-by-bit fashion to mark the rows in the DEPT column which match the search criterion. Thus, the dynamic indexing loop contains marker bits in bit positions 5, 6 and 7 indicating that these rows of the DEPT column match the search criterion TOY.

Command 2 is a DO-loop command which is done while the dynamic indexing loop is marked the same as it was after command 1 was executed. In the first part (A) of this command, items identified to the TOY department (i.e., qualified items) are placed in register N-1. Thus, in the first part of command 2, every tuple (row) where the TOY department was marked will be transferred to register N-1. The bits in the dynamic indexing loop are used to locate those items in the SALES table. The SELECT-NEXT command is used for this, since the toy department may list the same item more than once. For simplicity's sake, the table in FIG. 5 does not show duplicate items. In Example 3, duplicates will be present.

The header loop is used for the SELECT-NEXT operation. Thus, a bit is placed in the fifth bit position of the header loop indicating that the first item sold by the toy department is a pen, which appears in row 5 of the ITEM column.

In FIG. 5B, the selected unique items from the ITEM column are transferred from register N-1 to register C-2 in the data base logic cell associated with storage chip 2, which contains the TYPE table. In this operation, the list of unique items sold by the TOY department is transferred from the SALES table to the TYPE table. In command 2A, a counter for the marked bits in the dynamic indexing loop keeps a record of the looping operation for each unique item sold by the TOY department.

In command 2B, qualified items (i.e., non-redundant items) are successively selected. In command 2C, each unique item is transferred from register N-1 of the SALES table to register C-2 of the TYPE table.

Command 3 is a SELECT command in which records in the TYPE table are searched and qualified based on a match with the content of register C-2. Thus, this comparison picks out those items in the ITEM column of the TYPE table which are the same as the qualified items in the ITEM column of the SALES table which have been transferred to register C-2. Thus, in FIG. 5B, a bit has been placed in the dynamic indexing loop corresponding to the identification of a PEN in the fourth tuple of the ITEM column of the TYPE table.

moved so that they need not be retrieved in the subsequent loopings.

The sequence of commands used to execute this query are shown in the following table.

| COMMAND | TABLE | COLUMN | EXECUTION STATUS | | | | SETMARK | | |
|---|---|---|---|---|---|---|---|---|---|
| | | | DIL | A1 | A2 | TEST | DIL | A1 | A2 |
| WHILE UNMKD-CNT DO [ | EMP | | | | | ≠0 | | | |
| (1) SELECT-NEXT | EMP | MGR | OFF | | | =REGN | ON | ON | |
| (2) SELECT | EMP | NAME | | | | =REGN | | | ON |
| (3) READ | EMP | SAL | | | ON | | | | OFF |
| (4) SELECT | EMP | SAL | | ON | ON | | ≦REG1 | | OFF |
| (5) READ | EMP | NAME | | ON | | | | OFF | |
| ] | | | | | | | | | |

This matches the test criterion PEN which was transferred into register C-2 from register N-1. Since the test criterion correponds to an item sold by the toy department, the comparison in comparator 2 is an updated one in which only selected items are compared against.

Command 4 is a SELECT command in which the test criterion is the color GREEN. Qualified items in the TYPE table are now compared with the test criterion GREEN. Those qualified items are the ones in those tuples of the ITEM column in the TYPE table for which a marker bit was placed in the dynamic indexing loop. The same, or another, dynamic indexing loop can be used to keep track of all of the selected items which are green.

Command 5 is a READ command in which the final list of qualified items is read out of the ITEM column of the TYPE table. To do this, the read circuit associated with the dynamic indexing loop which keeps track of this final comparison activates the bubble chip controller associated with chip 2 to read out only the final list of qualified items.

In the execution of the query in this example, two tables were used, which contained a linking column. Dynamic indexing loops were used to keep track of items which passed each successive search and comparison test. Only those items which matched earlier comparison criteria were searched and compared against new criteria. In this manner, only data which is qualified at all times is searched further. Unqualified data is not further searched so as to spare unnecessary retrieval, and thereby enhancing overall operation speed. Further, redundant items need not be searched, since the SELECT-NEXT operation eliminates redundant searches. The header loop in conjunction with a regular index loop keep track of this operation.

EXAMPLE 3

Query: Find the names of the employees who earn more than their managers.

This query is directed at the data table:
EMPLOYEE, having column headings NAME, SALARY, DEPARTMENT, MANAGER.
Note that the managers are also employees, hence the entries in the MGR column also appear in the NAME column. This query is executed by going down the list of managers one by one, and comparing the manager's salary with his employees' salaries. In this query, the names of the managers are repeatedly searched; each time a unique value is selected and its duplicates re- In order to execute this query, the salary of each manager will have to be compared with the salary of the employees who report to him or her. However, the number of managers will generally be less than the total number of employees, since some managers will have more than one employee reporting to them. Rather than repeating a search each time the same manager's name reappears, a manager's name will be immediately put into register N-1 and the column of managers will then be traced down one by one.

The repetitive sequence of a series of commands is termed a "DO LOOP". Thus, in the execution table, commands 1–5 are repeated for each manager (a unique value) in the MGR column. The work DO followed by the brackets indicates the steps which are to be repeated. Thus, while there is an unmarked count, derivable from the DIL content, commands 1 through 5 are repeated each time a new manager is present in the MGR column.

In FIG. 6, the manager TOM is placed in register N-1, while in the bottom portion of this FIG. the manager SAM is placed in register N-1. Thus, in this FIG., the process of eliminating duplicates, first for TOM and then for SAM, is carried out. (COMMAND 1).

To perform this query, a header loop and three dynamic indexing loops (DIL, A1, A2) are used. The header loop just indicates where to take a manager's name from the MGR column to be placed in register N-1. The status of the other index loops is indicated in the STATUS column of the Table.

Register 1, referred to in the execution table, is an output register which can be located in the controller chip. Information which is to go to the outside world is placed into this register. If data is to be used with the comparator, then it will be placed in either reference register N-1 or register C-1. Data in these latter two registers is used internally in the relational data base apparatus, and is not provided to the outside world.

As noted previously, a DO-loop is a plurality of commands which are repeatedly exercised. The actions of such a DO-loop are described in the following steps.

1. The SELECT-NEXT command is always used with a DO-loop. This command means that a column is repeatedly searched; each time a unique value is selected and its duplicates are removed. A bit is placed in the header loop to indicate where a new search cycle begins. Initially, a "1-bit" is placed in the top of the header loop which directs that the manager's name TOM is to be placed in register REGN-1. The header mark indicates where a new search cycle begins, and which each cycle the header mark is advanced to the first value different from the present unique value. Thus, in the top half of FIG. 6, the 1-bit in the header loop is moved down to the fourth bit position, where the name SAM appears in the MGR column. This is the first name which is different from TOM in this column. All items below the header mark and not marked in DIL (i.e., those different from the already retrieved unique values and their duplicates) are compared to the contents of register N-1. Whenever there is a match, the record is marked in the redundancy-marker DIL loop to indicate redundancy.

Thus, 1-bits are placed in main index loop DIL as indicated by the status of this marker loop at the time period "after". As the bottom of the MGR column is reached, a new cycle will be initiated. The looping stops when the marker counter (derived from information in DIL) counts zero. Thus, as long as the TEST≠is met, looping will continue.

The name of the next manager (SAM) is retrieved and placed in REGN-1, and all duplicates are removed. This is indicated in the bottom half of FIG. 6, where the name SAM is placed in REGN-1. The header loop and main index loop DIL have the status they had after the manager TOM was examined in the top half of FIG. 6. Thus, the 1-bits in the header loop and in loop DIL during the time period "before" are the same as these bits were in the time period "after" in the upper half of FIG. 6.

The main index loop DIL is used to keep a record of selection of unique MGR values (indicated by blanks). The auxiliary index loop A1 (not shown in FIG. 6) is used to note the names of employees reporting to the manager whose name is currently in REGN-1.

2. During the "SELECT" command the manager's name (SAM) is referred to the NAME column via REGN-1. The second auxiliary index loop (A2, not shown in FIG. 6), is used to link the MGR column to the NAME column.

3. During the "READ" command, the manager's (SAM) salary is retrieved and placed in REGC.

4. In the next SELECT command, the salaries of the manager's (SAM) employees are compared to Sam's salary. That is, they are compared to the values in register C. Auxiliary indexing loop A1 is used to record the results of this comparison.

5. In the READ operation, the query result is read-out, with the appropriate index loops providing an input to the bubble chip controller, so that the readout is only of those employees whose salaries are greater than those of their managers.

Every dynamic indexing loop used together with a magnetic bubble storage chip receives its input from the comparator. Each dynamic indexing loop in a logic cell has associated therewith a write circuit and a read circuit, the read circuit being connected to the bubble chip controller for that bubble storage chip, while the write circuit is connected to the comparator in the logic cell.

INSTRUCTION SET

The following will briefly described an instruction set suitable for use with a relational data base system. This type of instruction set will be recognized by those having skill in the art of relational data base systems, and is presented here only for completeness.

One may essentially view a relational data base as a collection of data tables. The data will vary with time. The execution of a query can be likened to cutting existing tables to repaste into new tables. Thus the instruction set must provide capabilities for the creation, modification, and manipulation of tables, as listed below:

| | |
|---|---|
| Table Creation | FORMAT |
| | WRITE |
| Table Modification (Simple or Query-dependent) | INSERTION |
| | DELETION |
| | UPDATE |
| | MODIFICATION |
| | (i.e., ADD, SUB, MUL, DIV) |
| Table Manipulation | |
| Access | SELECT |
| | SCAN |
| | SELECT-NEXT |
| READ | READ(REGI) or simply READ |
| | READ(REGN) |
| | READ/AGGREGATE (SUM, AVG, MAX, MIN) |
| Reset | RESET |
| Miscellaneous Manipulating markers | MATCH |
| Looping | WHILE MKD-CNT (or UNMKD-CNT) ... DO |
| Branching | IF...THEN...ELSE |
| Linking tables | REGC (TABLE 2)←REGN TABLE 1) |

To create tables, the data attributes of each column must be specified (e.g., character, floating point or fixed point; field length, etc.), the serially input data arranged into tabular format in the storage devices, and the table and column headings specified and made accessible via the control microprocessor.

To keep the data up to date, facilities for insertion, deletion, and update must be provided. A number can also be added to, subtracted from, multiplied into, or divided into existing data. In fact, any specifiable function could be performed with existing data. The above modifications can be executed on call or on the basis of query results.

To manipulate data, one must first gain access. The provision of multiple transfer lines and marker loops facilitates the selective access and qualification of data. The associative search capability is applied to either single or multiple columns or alphanumerical items; and is also provided with the option to eliminate redundancy in the qualified items.

The qualified data are either read out or used to assemble new tables. Aggregate functions such as sum, average (AVG), select maximum (MAX), or minimum (MIN) can also be performed on a column of retrieved data.

Since the dynamic indexing loops are dynamic devices used to aid data manipulation, they are reset during or upon completion of queries.

Recurrent and branching operations are encountered in many queries. The ability to link different data tables is also a very useful operation.

SUMMARY

What has been described is a relational data base system using magnetic bubble domain storage, and in particular a storage in which data can be stored in tubular form. This eliminates the need for formatting the data as is required with relational data base systems using magnetic disk storage. Because the data structure (tabular) is mapped into the physical storage structure of the bubble domain chips, data processing is facilitated. In addition, the modularity of the data is aided by the modularity of accessing when groups of minor loop shift registers can be accessed individually.

This relational data base system also contains various indexing loops which can dynamically update the status of search and comparison operations. Because only qualified data is examined during each new comparison operation, it is no longer necessary to search and compare on data which does not qualify.

Further, certain of the dynamic indexing loops, termed header loops, are used to filter out qualified, but redundant, data. Again, this greatly reduces the amount of information to be transferred between two chips when two tables are being linked. These dynamic indexing loops can be provided on the bubble domain chip or external to the bubble domain chip. Also, since the dynamic indexing loops need only be 1 bit wide, they can be scanned extremely quickly. This is in direct contrast with a disk file relational data base system where marker bits are interspersed with data bits and must be read along with long strings of data bits.

Those of skill in the art will recognize that other embodiments can be provided for a relational data base system, using the principles of the present invention. For example, while bubble domain storage has been described, the principles of this invention can be realized with charge-coupled device (CCD) storage or with semiconductor storage chips. The important aspect of the storage chip which is utilized in this invention is the feature of array-like storage where data is stored in tabular form. Storage in this form enables a direct mapping of tubular data into the storage structure, and eliminates the need for complex data formatting.

The data base logic cells are the same regardless of the type of tabular storage (bubble domain, CCD, semiconductor, etc.) used. Of course, the comparator can be placed on the storage chip and be fabricated as part of the storage circuitry. For example, a bubble domain comparator comprising magnetic material can be fabricated on the magnetic bubble domain storage chip.

Having thus described our invention, what we claim as new, and desire to secure by Letters Patent is:

1. A relational data base system using magnetic bubble domains, comprising:
  at least one magnetic bubble domain storage chip for storing in tabular form on said chip a table of data forming a relation, wherein said data has physical locations defining a plurality of columns of data, there being a predetermined relationship between data items in said table, wherein said data is stored in said chip with a physical layout in accordance with said predetermined relationship,
  access means located on said storage chip for accessing selected columns of data from said table,
  sensor means located on said storage chip for detecting bubble domains in said chip,
  a directory for keeping track of the magnetic bubble domain chip in which a particular data table is stored and the location of columns of data in said tables, said directory being a storage unit for storing the addresses of said tables of data and being connected to a bubble chip controller which enables access of selected data within any of said tables of data, said directory including means for receiving inputs from a user of said relational data base system,
  a first data base logic cell connected to said storage chip and to said controller for performing queries relative to said data, said cell including:
    comparator means connected to receive data read from said storage chip for comparing the content of data in said chip with test criteria to determine match/mismatch thereof, wherein data which matches said test criteria is termed qualified data,
    at least one register connected to said comparator for providing said test criteria to said comparator,
    at least one dynamic indexing register connected to said comparator and responsive to the output of said comparator for keeping track of the matches in said comparator,
  a bubble chip controller connected to said access means for selecting particular data items from said table of data in said chip, said bubble chip controller being connected to said directory and to said dynamic indexing register to receive inputs therefrom to determine which of said data items are to be accessed after said comparison is made, said controller also being connected to write and read circuits on said storage chip for writing data into storage and for reading data from storage,
  means including said comparator means connected to said dynamic indexing register for updating the content of said at least one dynamic indexing register to place information bits into said indexing register indicative of only those data items from said table which have satisfied cumulative comparisons of data and test criteria in said comparator wherein said controller receives the output from said dynamic indexing register in order to access only those data items from said table of data which have satisfied said cumulative comparisons.

2. The system of claim 1, further including at least one other bubble domain storage chip and a second data base logic chip having the same components as said bubble domain storage chip and said logic cell described in claim 1, and
  means for interconnecting said at least one register in said first and second data base logic chips in order to retrieve a data item from one of said chips to be used as a test criterion for comparison with data from the other chip.

3. The system of claim 2, where said bubble domain chips are organized in a major/minor loop type of memory organization, including a plurality of shift register loops for storing said columns of data forming said table and means in said access means for accessing data from selected ones of said plurality of shift register loops.

4. The system of claim 3, including means connected to said storage chip for repeating searches of data from a selected column of data in a relation and dynamic indexing register means for keeping track of qualified values of data in said selected column of data, and
  means responsive to said dynamic indexing register means for sending only said qualified values of data to said comparator to further compare said qualified values of data with current test criterion therein.

5. The system of claim 1, including a sense amplifier connected to said sensor means and responsive to the output of said sensor means,
said data base logic chip including:

a first register connected to said sense amplifier for receiving data read from said bubble domain chip, the output of said first register being connected to said comparator means for establishing test criteria in said comparator means, a second register connected to said sense amplifier for receiving data read from said bubble domain chip, the output of said second register being connected to said comparator means for establishing test criteria in said comparator means, a write circuit connected between said comparator means and said dynamic indexing register for writing bits into said dynamic indexing register when said test criteria is satisfied, as indicated by said comparator, and a read circuit connected between said dynamic indexing register and said bubble chip controller to read the contents of said dynamic indexing register, the selection of data from said storage chip being determined by the contents of said dynamic indexing register.

6. A relational data base system using magnetic bubble domain storage of information, comprising:

a plurality of magnetic bubble domain storage chips for relating and storing data on each said chip in physical locations defining a table of rows and columns, said data being related when arranged in said tables to define predetermined relationships between data items, each said chips including access means located on each said storage chip for accessing data in selected columns of said storage chip in response to an input from a bubble chip controller, and sensing means for sensing said accessed bubble domains to produce electrical signals representative thereof, comparison means connected to each said sensing means for receiving said electrical signals and for first comparing said electrical signals with test criteria supplied to said comparison means, dynamic indexing registers responsive to the outputs of said comparison means, the contents of said registers indicating satisfaction of said test criteria in said first comparison, said dynamic indexing registers providing inputs to said bubble chip controllers, bubble chip controllers connected to said access means for determining which columns of data in said storage chips are to be accessed in response to inputs received from said dynamic indexing registers, means connected to each said comparison means for changing said test criteria in each said comparison means, means including said bubble chip controllers and said access means for accessing only those data items located in said bubble domain chips at locations corresponding to locations of bits placed in said dynamic indexing registers, each said comparison means performing a comparison on said only those accessed data items with respect to new test criteria in each said comparison means.

7. The system of claim 6, where each said means for changing said test criteria includes a first register which is connected to said sensing means and to said comparison means and which receives new test criteria from said bubble domain chip for passage to said comparison means.

8. A relational data base system, comprising:

first and second storage chips for storing in tabular form a table of data forming a relation, each said table including a plurality of columns of data, the physical locations of said data in each chip being in rows and columns in accordance with a predetermined relationship between the data items in said tables of data, access means located on each said storage chip for accessing selected columns of data from said tables, sensor means located on each said chip for detecting data in said chips, a directory for keeping track of the storage chip in which a particular data table is stored and the location of columns of data in said tables, said directory being a storage unit for storing the addresses of said tables of data and being connected to a storage chip controller which enables access of selected data within any of said tables of data, said directory including means for receiving inputs from a user of said relational data base system, first and second data base logic cells connected to said first and second storage chips, respectively, and to said controller for performing queries relative to said data, each said cell including:

comparator means connected to receive data read from said storage chips for comparing the content of data in said chip with test criteria to determine satisfaction thereof, wherein data which satisfies said criteria is termed qualified data, at least one register connected to said comparator for providing said test criteria to said comparator, at least one dynamic indexing register connected to said comparator and responsive to the output of said comparator for keeping track of the matches in said comparator, at least one storage chip controller connected to said access means for selecting qualified data items from said table of data in each said chip, said storage chip controller being connected to said directory and to said dynamic indexing register to receive inputs therefrom to determine which of said data items are qualified data items after said comparison is made, means connected to each said dynamic indexing register for updating the contents of each said dynamic indexing register to put new information into each said indexing register indicative of cumulative comparisons of data and test criteria in each said comparator, means for interconnecting said at least one register in said first and second data base logic chips in order to retrieve a data item from a first chip to be used as a test criterion in the second chip, means including said access means and said controller for reporting searches of data from a selected column of data in a relation and dynamic indexing register means for keeping track of qualified data in said selected column of data, and means including said controller responsive to said dynamic indexing register means for sending only said qualified data to said comparator to determine satisfaction of said qualified data with current test criterion therein.

9. The system of claim 8, where said data is a coded pattern of electrical charges in CCD storage chips.

10. The system of claim 8, where said data is a coded pattern in a semiconductor storage chip.

11. The system of claim 8, where said storage chip stores said data in registers along which said data move, said dynamic indexing means being a register having the same length as said registers in said storage chip, information movement in said dynamic indexing register being synchronized with data movement in the registers in said storage chip.

12. The system of claim 8, where said storage chips are magnetic bubble domain chips which store tables of data to form relations of said data, the physical layout of said data on said chip corresponding to said tabulator storage in rows and columns.

* * * * *